US012784984B2

(12) United States Patent
Yoon et al.

(10) Patent No.: US 12,784,984 B2
(45) Date of Patent: Nov. 3, 2026

(54) MULTILAYER ELECTRONIC COMPONENT CONTAINING Cu-CONTAINING OXIDE

(71) Applicant: SAMSUNG ELECTRO-MECHANICS CO., LTD., Suwon-si (KR)

(72) Inventors: Hye Sung Yoon, Suwon-si (KR); San Kyeong, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 137 days.

(21) Appl. No.: 18/919,751

(22) Filed: Oct. 18, 2024

(65) Prior Publication Data

US 2025/0218682 A1 Jul. 3, 2025

(30) Foreign Application Priority Data

Dec. 28, 2023 (KR) ........................ 10-2023-0194440

(51) Int. Cl.
*H01G 4/232* (2006.01)
*H01G 4/30* (2006.01)
*H01G 4/12* (2006.01)

(52) U.S. Cl.
CPC ............. *H01G 4/2325* (2013.01); *H01G 4/30* (2013.01); *H01G 4/12* (2013.01)

(58) Field of Classification Search
CPC ......... H01G 4/2325; H01G 4/232; H01G 4/30
See application file for complete search history.

(56) References Cited

U.S. PATENT DOCUMENTS

| | | | | |
|---|---|---|---|---|
| 2006/0028788 A1* | 2/2006 | Sridharan | ................ | H01G 4/30 361/523 |
| 2013/0201601 A1* | 8/2013 | Nishisaka | .............. | H01G 4/306 361/301.4 |
| 2015/0116895 A1* | 4/2015 | Yoo | .......................... | H01G 4/30 156/89.18 |
| 2021/0065980 A1 | 3/2021 | Jung et al. | | |
| 2023/0187138 A1 | 6/2023 | Park et al. | | |

FOREIGN PATENT DOCUMENTS

| | | |
|---|---|---|
| KR | 10-2019-0116165 A | 10/2019 |
| KR | 10-2023-0087092 A | 6/2023 |

* cited by examiner

*Primary Examiner* — Eric W Thomas
(74) *Attorney, Agent, or Firm* — Morgan, Lewis & Bockius LLP

(57) ABSTRACT

A multilayer electronic component may include: a body including a dielectric layer and internal electrodes alternately arranged in a first direction with the dielectric layer interposed therebetween; and external electrodes respectively disposed on surfaces of the body opposing each other in a second direction perpendicular to the first direction, and the external electrodes may include electrode layers connected to the internal electrodes and including Cu and a Cu-containing oxide, and in the electrode layer, when a region disposed on a center of the body in the first direction is defined as a center portion, and regions disposed on both sides of the center portion in the first direction and having a convex shape in the second direction are defined as side portions, a content of the Cu-containing oxide in the side portion may be greater than the content of the Cu-containing oxide in the center portion.

18 Claims, 8 Drawing Sheets

I-I'

MULTILAYER ELECTRONIC COMPONENT CONTAINING Cu-CONTAINING OXIDE

CROSS-REFERENCE TO RELATED APPLICATION(S)

This application claims benefit of priority to Korean Patent Application No. 10-2023-0194440 filed on Dec. 28, 2023, in the Korean Intellectual Property Office, the disclosure of which is incorporated herein by reference in its entirety.

TECHNICAL FIELD

The present disclosure relates to a multilayer electronic component.

A multilayer ceramic capacitor (MLCC), a multilayer electronic component, is a chip-type condenser, mounted on the printed circuit boards of various types of electronic products, such as image display devices including a liquid crystal display (LCD) and a plasma display panel (PDP), computers, smartphones and mobile phones, an on-board charger (OBC) of an electric vehicle, and circuits such as DC-DC converter, and serves to charge or electricity therein or discharge electricity therefrom.

The multilayer ceramic capacitor may be used as a component in various electronic devices due to having a small size, ensuring high capacitance and being easily mounted. With the miniaturization and implementation of high output power of various electronic devices such as computers and mobile devices, demand for miniaturization and high capacitance of multilayer ceramic capacitors has also been increasing.

Additionally, when the multilayer ceramic capacitor is used in circuits of an electric vehicle, demand for securing maximum capacitance in an appropriate size while withstanding harsh physical loads has been increased.

An external electrode of the multilayer ceramic capacitor may have a conductive resin layer structure in which a conductive metal filler is added to a polymer such as a conductive resin of an electrode layer, utilizing a conductive metal as a main component, or may have a structure in which a plating layer is formed on the electrode layer utilizing the conductive metal as a main component.

In order to reduce the proportion of the external electrode in all components, if a thickness of the electrode layer is formed thinly without fine adjustment, the problem of the plating solution easily penetrating during a formation process of the plating layer may occur.

Accordingly, even when a multilayer electronic component such as a multilayer ceramic capacitor is exposed to harsh environments, there is a need for improvement in an external electrode structure that may reduce a thickness thereof and improve sealing, even when the multilayer electronic components such as the multilayer ceramic capacitor is exposed to harsh environments.

SUMMARY

An aspect of the present disclosure is to improve capacitance per unit volume of a multilayer electronic component.

An aspect of the present disclosure is to improve sealing properties of a multilayer electronic component.

However, the aspects of the present disclosure are not limited to the above-described contents, and may be more easily understood in the process of describing specific embodiments of the present disclosure.

A multilayer electronic component according to an example embodiment of the present disclosure may include: a body including a dielectric layer and internal electrodes alternately arranged in a first direction with the dielectric layer interposed therebetween; and an external electrode disposed on surfaces of the body opposing each other in a second direction that is perpendicular to the first direction, and the external electrode may include an electrode layer connected to the internal electrodes and including Cu and a Cu-containing oxide, and in the electrode layer, when a region disposed on a center of the body in the first direction is defined as a center portion, and a region disposed on a side of the center portion in the first direction and having a convex shape in the second direction are defined as a side portion, a content of the Cu-containing oxide in the side portion may be greater than the content of the Cu-containing oxide in the center portion.

One of the various effects of the present disclosure is to improve capacitance per unit volume of a multilayer electronic component by thinning an external electrode by controlling a shape of the external electrode.

One of the various effects of the present disclosure is to improve sealing properties of a multilayer electronic component by preventing external substances such as a plating solution from damaging an electrode layer.

One of the various effects of the present disclosure is to improve the capacitance per unit volume and the sealing properties of a multilayer electronic component by preventing external substances such as a plating solution from damaging an electrode layer even when the external electrode is thinned.

Advantages and effects of the present disclosure are not limited to the foregoing content and may be more easily understood in the process of describing a specific example embodiment of the present disclosure.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
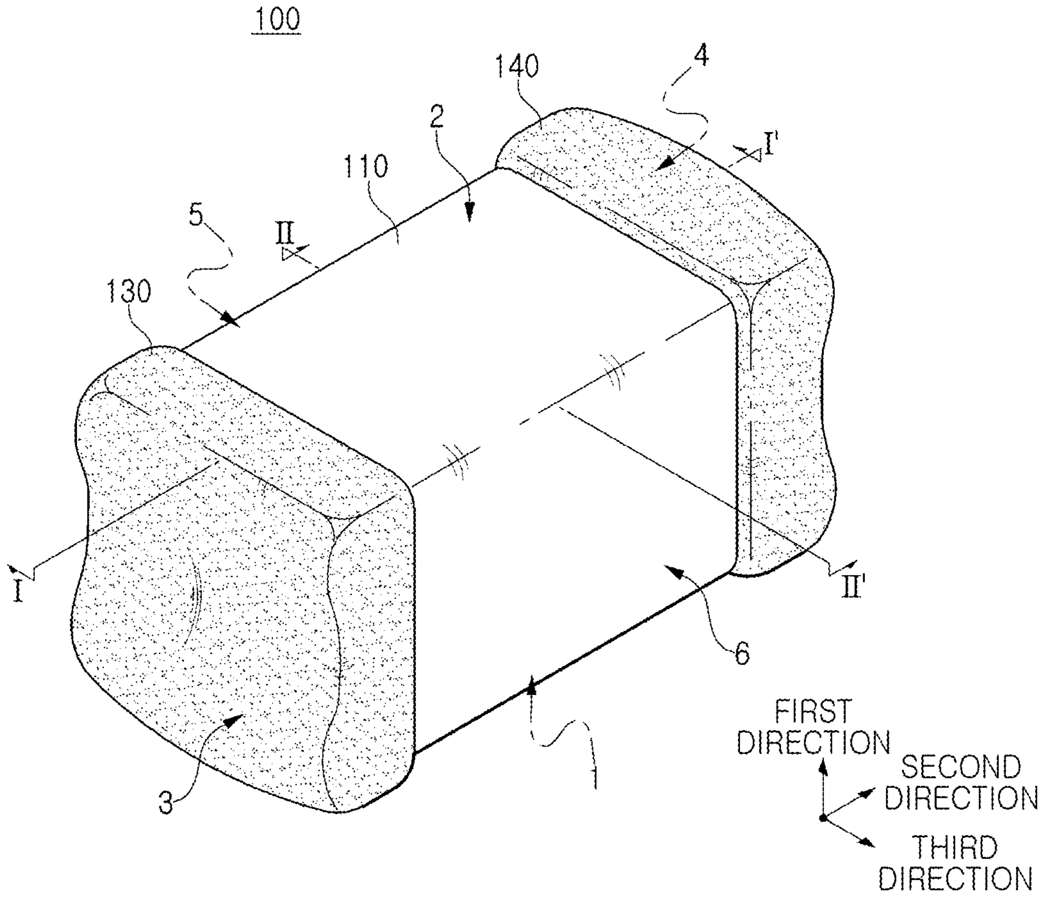
FIG. 1 is a perspective view schematically illustrating a multilayer electronic component according to an example embodiment of the present disclosure.

Hereinafter, example embodiments of the present disclosure will be described with reference to specific example embodiments and the attached drawings. The example embodiments of the present disclosure may, however, be exemplified in many different forms and should not be construed as being limited to the specific embodiments set forth herein. The example embodiments disclosed herein are provided for those skilled in the art to better explain the present disclosure. Therefore, in the drawings, the shapes and dimensions of elements may be exaggerated for clarity, and the same reference numerals will be used throughout to designate the same or like elements.

In addition, in order to clearly describe the present disclosure in the drawings, contents unrelated to the description are omitted, and since sizes and thicknesses of each component illustrated in the drawings are arbitrarily illustrated for convenience of description, the present disclosure is not limited thereto. In addition, components with the same function within the same range of ideas are described using the same reference numerals. Throughout the specification, when a certain portion "includes" or "comprises" a certain component, this indicates that other components are not excluded and may be further included unless otherwise noted.

In the drawings, a first direction may be defined as a stacking direction or a thickness (T) direction, a second direction may be defined as a length (L) direction, and a third direction may be defined as a width (W) direction.

FIG. 1 is a perspective view schematically illustrating a multilayer electronic component according to an example embodiment of the present disclosure.

Figure 2:
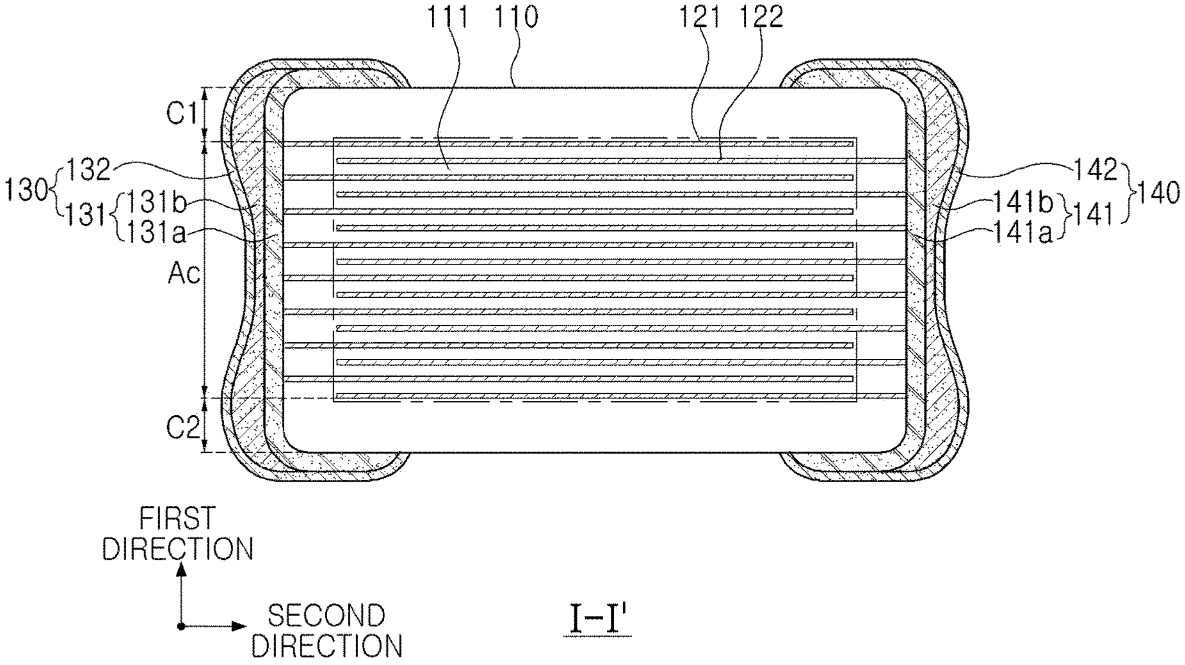
FIG. 2 is a cross-sectional view taken along line I-I' in FIG. 1.

FIG. 2 is a cross-sectional view taken along line I-I' in FIG. 1.

Figure 3:
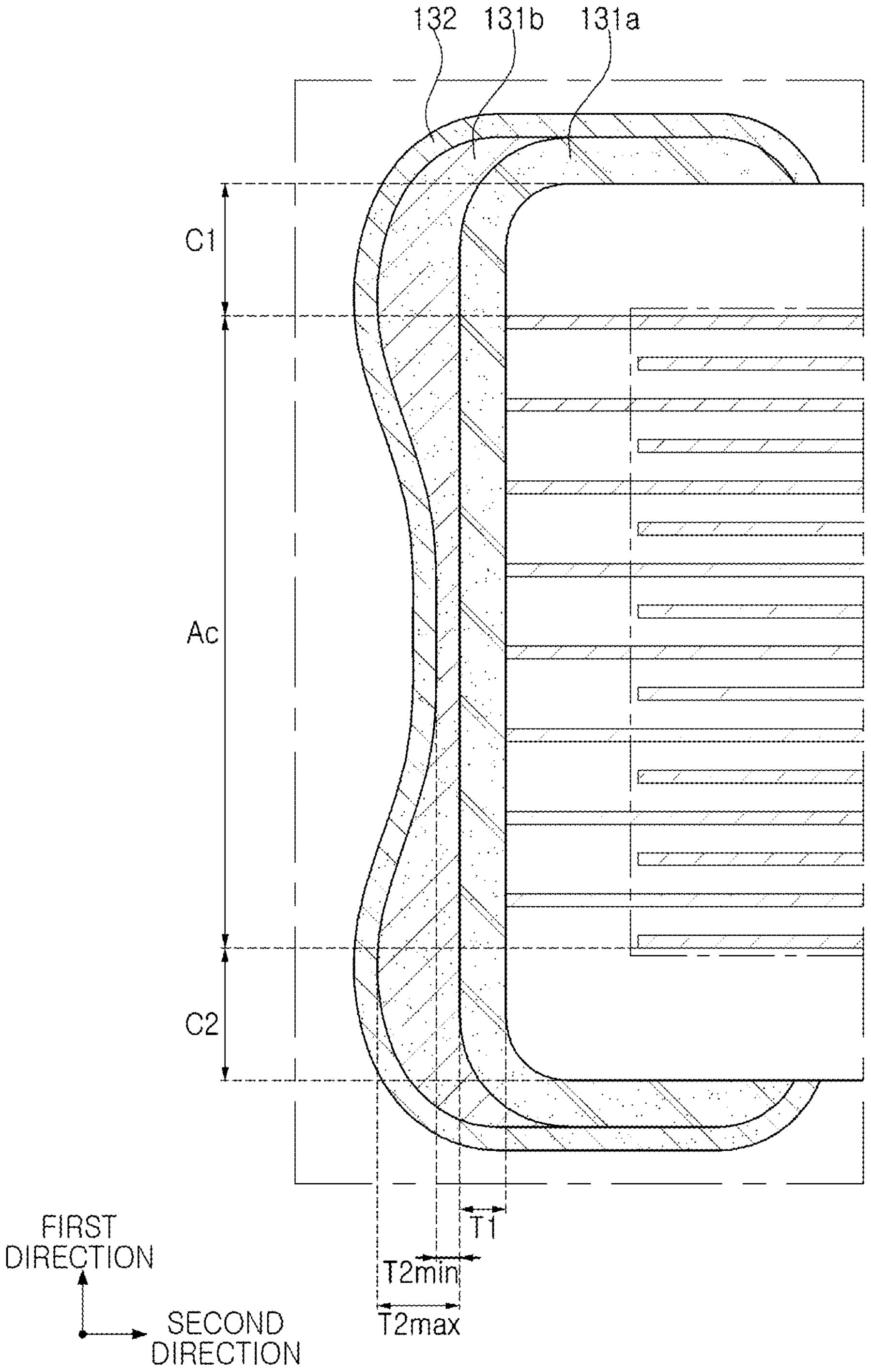
FIG. 3 is an enlarged view of a region in which a first external electrode illustrated in FIG. 2 is disposed.

FIG. 3 is an enlarged view of a region in which a first external electrode illustrated in FIG. 2 is disposed.

Figure 4:
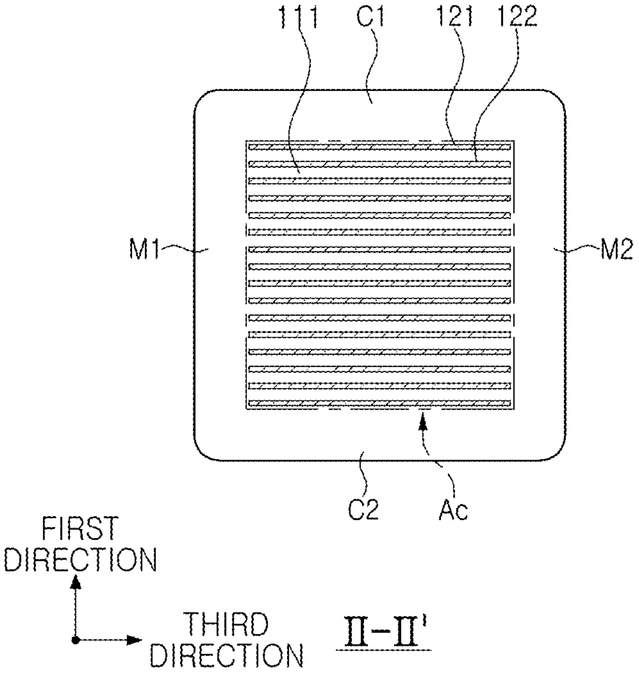
FIG. 4 is a cross-sectional view taken along line II-II' in FIG. 1.

FIG. 4 is a cross-sectional view taken along line II-II' in FIG. 1.

Figure 5:
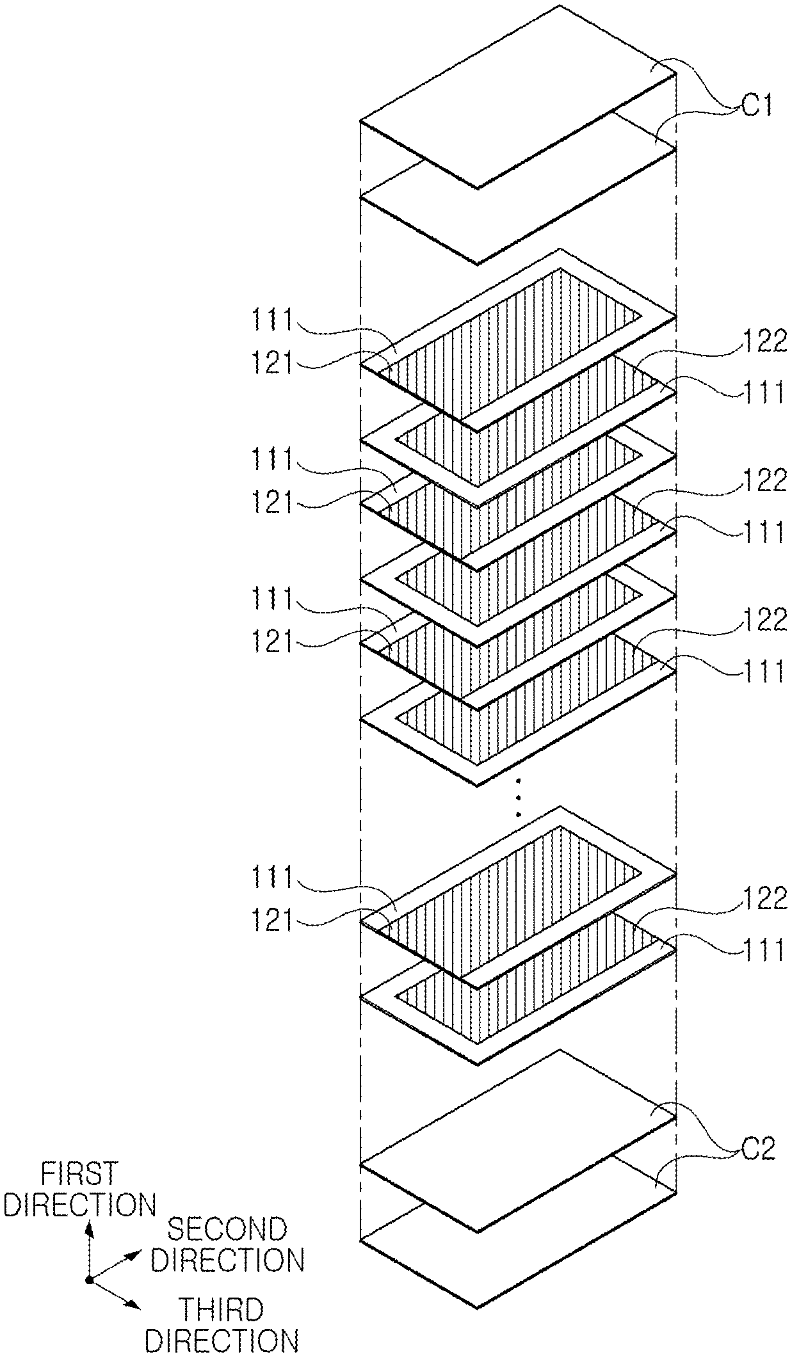
FIG. 5 is an exploded perspective view illustrating a body according to an example embodiment.

FIG. 5 is an exploded perspective view illustrating a body according to an example embodiment.

Figure 8:
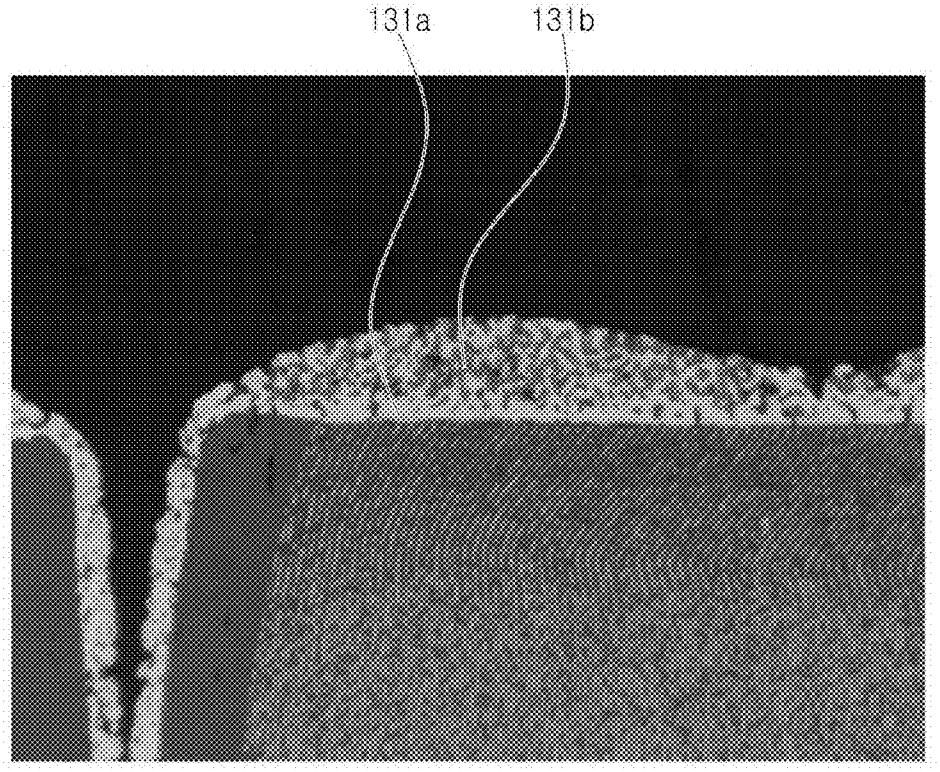
FIG. 8 is an image obtained by observing a region in which an electrode layer is formed in a first and second directional cross-section with an optical microscope (OM) after forming an electrode layer in a multilayer electronic component according to an example embodiment.

FIG. 8 is an image obtained by observing a region in which an electrode layer is formed in a first and second directional cross-section with an optical microscope (OM) after forming an electrode layer in a multilayer electronic component according to an example embodiment.

Hereinafter, a multilayer electronic component 100 according to an example embodiment of the present disclosure and various embodiments thereof will be described in detail with reference to FIGS. 1 to 5 and 8.

According to an example embodiment of the present disclosure, a multilayer electronic component 100 may include a body 110 including a dielectric layer 111 and internal electrodes 121 and 122 alternately arranged in a first direction with the dielectric layer 111 interposed therebetween, and external electrodes 130 and 140 respectively disposed on surfaces of the body 110 opposing each other in a second direction when a direction, perpendicular to the first direction, is defined as a second direction, and a direction, perpendicular to the first direction and the second direction, is defined as a third direction, and the external electrodes 130 and 140 may include electrode layers 131 and 141 connected to the internal electrodes 121 and 122 and including Cu and an Cu-containing oxide, and in the electrode layers 131 and 141, when a region disposed on a center of the body 110 in the first direction is defined as a center portion, and regions disposed on both sides of the center portion in the first direction and having a convex shape in the second direction are defined as side portions, a content of the Cu-containing oxide in the side portion may be greater than a content of the Cu-containing oxide in the center portion.

The body 110 may have the dielectric layer 111 and the internal electrodes 121 and 122 alternately stacked with each other. Specifically, the internal electrodes 121 and 122 may be alternately arranged with the dielectric layer 111 interposed therebetween.

A specific shape of the body 110 is not particularly limited, but as illustrated, the body 110 may have a hexahedral shape or a shape similar thereto. Due to contraction of ceramic powder particles included in the body 110 during a sintering process, the body 110 may not have a hexahedral shape with entirely straight lines but may have a substantially hexahedral shape.

The body 110 may include first and second surfaces 1 and 2 opposing each other in the first direction, third and fourth surfaces 3 and 4 connected to the first and second surfaces 1 and 2 and opposing each other in the second direction, and fifth and sixth surfaces 5 and 6 connected to the first and second surfaces 1 and 2 and connected to the third and fourth surfaces 3 and 4 and opposing each other in the third direction.

As margin regions in which the internal electrodes 121 and 122 are not disposed overlap each other on the dielectric layer 111, resulting in an occurrence of a step portion due to a thickness of the internal electrodes 121 and 122, and thus, a corner connecting the first surface and the third to fifth surfaces and/or a corner connecting the second surface and the third to fifth surfaces may have a shape contracted toward the center of the body 110 in the first direction based on the first surface or the second surface. Alternatively, due to a contraction behavior during the sintering process of the body, a corner connecting the first surface 1 and the third to sixth surfaces 3, 4, 5 and 6 and/or a corner connecting the second surface 2 and the third to sixth surfaces 3, 4, 5 and 6 may have a shape contracted toward the center of the body 110 in the first direction based on the first surface or the second surface. Alternatively, in order to prevent chipping defects, a corner connecting each surface of the body 110 may be rounded by performing a separate process, so that the corner connecting the first surface and the third to sixth surfaces and/or a corner connecting the second surface and the third to sixth surfaces may have a rounded shape.

In a state in which a plurality of dielectric layers 111 forming the body 110 are sintered, boundaries between adjacent dielectric layers 111 may be integrated to such an extent as to be difficult to identify without using a scanning electron microscope (SEM). The number of stacked layers of the dielectric layers is not particularly limited, and may be determined in consideration of the size of the multilayer electronic component. For example, 400 or more dielectric layers may be stacked to form a body.

The dielectric layer 111 may be formed by producing a ceramic slurry containing ceramic powder particles, an organic solvent and a binder, applying and drying the slurry on a carrier film to prepare a ceramic green sheet, and then sintering the ceramic green sheet. The ceramic powder particles are not particularly limited as long as sufficient electrostatic capacitance may be obtained therewith, and for example, barium titanate-based ($BaTiO_3$) powder particles may be used as the ceramic powder particles. For more specific examples, barium titanate-based ($BaTiO_3$) powder particles may be one or more of $BaTiO_3$, $(Ba_{1-x}Ca_x)TiO_3$ ($0<x<1$), $Ba(Ti_{1-y}Ca_y)O_3$ ($0<y<1$), $(Ba_{1-x}Ca_x)(Ti_{1-y}Zr_y)O_3$ ($0<x<1$, $0<y<1$), and $Ba(Ti_{1-y}Zr_y)O_3$ ($0<y<1$), and $CaZrO_3$-paraelectric powder particles may be $(Ca_{1-x}Sr_x)(Zr_{1-y}Ti_y)O_3$ ($0<x<1$, $0<y<1$).

Accordingly, the dielectric layer 111 may include one or more of $BaTiO_3$, $(Ba_{1-x}Ca_x)TiO_3$ (0<x<1), $Ba(Ti_{1-y}Ca_y)O_3$ (0<y<1), $(Ba_{1-x}Ca_x)(Ti_{1-y}Zr_y)O_3$ (0<x<1, 0<y<1), $Ba(Ti_{1-y}Zr_y)O_3$ (0<y<1), and $(Ca_{1-x}Sr_x)(Zr_{1-y}Ti_y)O_3$ (0<x<1, 0<y<1).

An average thickness td of the dielectric layer 111 is not particularly limited.

In order to implement miniaturization and high capacitance of the multilayer electronic component 100, the average thickness td of the dielectric layer 111 may be 0.35 μm or less, and in order to improve the reliability of the multilayer electronic component 100 under high temperature and high voltage, the average thickness td of the dielectric layer 111 may be 3 μm or more.

The average thickness td of the dielectric layer 111 may be measured by scanning an image of a third and first directional cross-section (L-T cross-section) of the body 110 with a scanning electron microscope (SEM).

For example, with respect to a total of five dielectric layers, two layers to an upper portion and two layers to a lower portion based on a first layer of the dielectric layer at a point at which a longitudinal center line of the body meets a thickness-direction center line thereof among the dielectric layers extracted from an image of a length and thickness direction (L-T) cross-section obtained by cutting a center of the body 110 in a width direction scanned by the scanning electron microscope (SEM), an average thickness td of the dielectric layer 111 may be measured by setting, to equal intervals, five points, that is, two points to the left and two points to the right, centered on the one reference point and then measuring thicknesses of each point, based on the point at which the longitudinal center line of the body meets the thickness-direction center line thereof.

The body 110 may include a capacitance formation portion Ac, which is a region including a first internal electrode 121 and a second internal electrode 122 disposed to face each other with the dielectric layer 111 interposed therebetween. Specifically, the capacitance formation portion Ac may refer to a region between an internal electrode disposed in one end in the first direction, among the internal electrodes 121 and 122, and an internal electrode disposed in the other end in the first direction, among the internal electrodes 121 and 122.

Since the capacitance formation portion Ac is a region in which the first internal electrode 121 and the second internal electrode 122 are arranged alternately with the dielectric layer 111 interposed therebetween, the capacitance formation portion Ac may serve to form electrostatic capacitance.

Meanwhile, the capacitance formation portion Ac may include a region in which the first and second internal electrodes 121 and 122 directly involved in capacitance formation overlap each other in the first direction, and length-margin portions may be formed on one side and the other side of the region, in the second direction, in which the first and second internal electrodes 121 and 122 overlap each other in the first direction. The length-margin portions may play a role of imparting different polarities to the first internal electrode 121 and the second internal electrode 122, and may serve to increase a path of moisture penetration.

The body 110 may include a capacitance formation portion Ac in which capacitance is formed by including the first internal electrode 121 and the second internal electrode 122 disposed in the body 110 and disposed to face each other with the dielectric layer 111 interposed therebetween, and cover portions C1 and C2 formed on an upper portion and a lower portion of the capacitance formation portion Ac in the first direction.

Meanwhile, the body 110 may be formed by additionally disposing the cover portions C1 and C2 on a stack body in which the first internal electrode 121 and the second internal electrode 122 are alternately arranged in the first direction with the dielectric layer 111 interposed therebetween, as illustrated in FIG. 5.

The internal electrodes 121 and 122 may include the first and second internal electrodes 121 and 122. The first and second internal electrodes 121 and 122 may be alternately arranged to face each other with the dielectric layer 111 included in the body 110 interposed therebetween, and may be exposed to the third and fourth surfaces 3 and 4 of the body 110, respectively.

The first internal electrode 121 may be spaced apart from the fourth surface 4 and exposed through the third surface 3, and the second internal electrode 122 may be spaced apart from the third surface 3 and may be exposed through the fourth surface 4. A first external electrode 130 may be disposed on the third surface 3 of the body and may be connected to the first internal electrode 121, and a second external electrode 140 may be disposed on the fourth surface 4 of the body and may be connected to the second internal electrode 122.

That is, the first internal electrode 121 may be connected to the first external electrode 130 without being connected to the second external electrode 140, and the second internal electrode 122 may be connected to the second external electrode 140 without being connected to the first external electrode 130. Accordingly, the first internal electrode 121 may be spaced apart from the fourth surface 4 by a predetermined distance, and the second internal electrode 122 may be spaced apart from the third surface 3 at a predetermined distance. Additionally, the first and second internal electrodes 121 and 122 may be spaced apart from the fifth and sixth surfaces of the body 110 by a predetermined distance.

The conductive metal included in the internal electrodes 121 and 122 may be at least one of Ni, Cu, Pd, Ag, Au, Pt, In, Sn, Al, Ti, and alloys thereof, and the present disclosure is not limited thereto.

An average thickness the of the internal electrodes 121 and 122 is not particularly limited and may vary depending on the purpose. In order to implement miniaturization of the multilayer electronic component 100, the average thickness the of the internal electrodes 121 and 122 may be 0.35 μm or less, and in order to improve the reliability of the multilayer electronic component 100 under high temperature and high voltage, the average thickness the of the internal electrodes 121 and 122 may be 3 μm or more.

With respect to a total of five internal electrodes, two layers to an upper portion and two layers to a lower portion based on a first layer of the internal electrode at a point at which a longitudinal center line of the body meets a thickness-direction center line thereof among the internal electrodes extracted from an image of a length and thickness direction (L-T) cross-section obtained by cutting a center of the body 110 in a width direction scanned by the scanning electron microscope (SEM), an average thickness the of the internal electrode 121 and 122 may be measured by setting, to equal intervals, five points, that is, two points to the left and two points to the right, centered on the one reference point and then measuring thicknesses of each point, based on the point at which the longitudinal center line of the body meets the thickness-direction center line thereof.

The cover portions C1 and C2 may be disposed on an upper surface and a lower surface of the capacitance formation portion Ac in the first direction.

The cover portions C1 and C2 may basically serve to prevent damage to the internal electrode due to physical or chemical stress.

The cover portions C1 and C2 may include the same material as the dielectric layer 111. That is, the cover portions C1 and C2 may include a ceramic material, may include, for example, a barium titanate ($BaTiO_3$)-based ceramic material.

Meanwhile, a thickness of the cover portions C1 and C2 does not need to be particularly limited. For example, a thickness tc1 of the cover portions C1 and C2 may be 20 μm or less, respectively.

The average thickness tc1 of the cover portions C1 and C2 may refer to a first directional size, and may be an average value of the first direction sizes of the cover portions C1 and C2 measured at five points equally spaced apart from each other in an upper portion or a lower portion of the capacitance formation portion Ac.

Additionally, margin portions M1 and M2 may be disposed on a side surface of the capacitance formation portion Ac.

The margin portions M1 and M2 may include a first margin portion M1 disposed on the fifth surface 5 of the body 110 and a second margin portion M2 disposed on the sixth surface 6. That is, the margin portions M1 and M2 may be disposed on both end surfaces of the ceramic body 110 in the width direction.

The margin portions M1 and M2 may refer to a region between both two ends of the first and second internal electrodes 121 and 122 and a boundary surface of the body 110 in a cross-section obtained by cutting the body 110 in a width-thickness (W-T) direction, as illustrated in FIG. 3.

The margin portions M1 and M2 may basically serve to prevent damage to the internal electrodes due to physical or chemical stress.

The margin portions M1 and M2 may be formed by forming the internal electrodes by applying a conductive paste except for a region in which the margin portion is to be formed on the ceramic green sheet.

Meanwhile, a width of the margin portions M1 and M2 need not be particularly limited. For example, the average width of the margin portions M1 and M2 may be 20 μm or less, respectively.

The average width of the margin portions M1 and M2 may refer to an average size of a region, in the third direction, in which the internal electrode is spaced apart from the fifth surface, and an average size of a region, in the third direction, in which the internal electrode is spaced apart from the sixth surface, and may be an average value of the third directional values of the margin portions M1 and M2 measured at five points equally spaced apart from each other on the side surface of the capacitance formation portion Ac.

The external electrodes 130 and 140 may be respectively disposed on the third surface and the fourth surface 3 and 4 that are the surfaces of the body 110 opposing each other in the second direction.

The external electrodes 130 and 140 may be disposed on the surfaces 3 and 4 of the body 110 opposing each other in the second direction and may be connected to the internal electrodes 121 and 122.

More specifically, the first external electrode 130 may be disposed on the third surface 3 and may be connected to the first internal electrode 121, and the second external electrode 140 may be disposed on the fourth surface 4 and may be connected to the second internal electrode 122.

In an example embodiment, a structure in which the multilayer electronic component 100 has two external electrodes 130 and 140 has been described, but the number or shape of the external electrodes 130 and 140 may be changed depending on the shape of the internal electrodes 121 and 122 or other purposes.

The size of the multilayer electronic component 100 does not need to be particularly limited.

For example, in order to achieve miniaturization and high capacitance at the same time, the multilayer electronic component 100 may have a size of 0201 (length×width, 0.2 mm×0.1 mm) or less, and in the case of a product for which reliability in a high temperature and high voltage environment is decisive, the multilayer electronic component 100 may have a size of 3216 (length×width, 3.2 mm×1.6 mm) or more, but the present disclosure is not limited thereto.

Here, a length of the multilayer electronic component 100 may refer to a maximum size of the multilayer electronic component 100 in the second direction, a thickness of the multilayer electronic component 100 may refer to a maximum size of the multilayer electronic component 100 in the first direction, and a width of the multilayer electronic component 100 may refer to a maximum size of the multilayer electronic component 100 in the third direction.

Hereinafter, the structure of the external electrodes 130 and 140 according to an example embodiment of the present disclosure will be described in more detail.

The external electrodes 130 and 140 may include electrode layers 131 and 141 connected to the internal electrodes 121 and 122 and including Cu and a Cu-containing oxide.

Referring to FIGS. 1, 2 and 3, in the electrode layers 131 and 141, a region disposed on the center of the body 110 in the first direction may be defined as a center portion, and regions disposed on both sides of the center portion in the first direction and having a convex shape in the second direction may be defined as side portions. In this case, according to an example embodiment of the present disclosure, a content of the cu-containing oxide in the side portion may be greater than the content of the cu-containing oxide in the center portion.

In the conventional case of an electrode layer formed by applying Cu paste on the body and sintering the paste, a center region of an electrode layer disposed in the center of the body may be formed thicker than other regions due to surface tension. Accordingly, as a result of an increase in the proportion of the external electrodes in the entire multilayer electronic component, it may be difficult to secure sufficient capacitance per unit volume of the multilayer electronic component.

Accordingly, in an example embodiment of the present disclosure, in the electrode layers 131 and 141, the side portions, regions having a convex shape in two directions, may be formed on both first directional sides of the center portion disposed in the center of the body 110 in first direction, so that the proportion of the external electrodes 130 and 140 in the entire multilayer electronic component 100 may be effectively reduced, thereby improving the capacitance per unit volume of the multilayer electronic component 100. Specifically, because the side portions of the electrode layers 131 and 141 are regions adjacent to the cover portions C1 and C2 or a corner of the body 110, the side portions thereof may be vulnerable to external moisture penetration. However, according to an example embodiment of the present disclosure, since the side portions, regions vulnerable to external moisture penetration, are formed to have the convex shape, a thickness of the side portions may be formed to be thicker, and since a thickness of the center portion, a region relatively not vulnerable to external moisture penetration, may be reduced, the proportion of the external electrodes 130 and 140 in the entire multilayer electronic component 100 may be effectively reduced while preventing a decrease in moisture resistance reliability.

Meanwhile, the electrode layers 131 and 141 according to an example embodiment of the present disclosure may include Cu and a Cu-containing oxide. Cu may serve to secure electrical connectivity together with a conductive metal that may be included in the internal electrode 121 and 122.

The electrode layer formed by applying a Cu paste on the body and sintering the paste may easily be dissolved by an external plating solution because the electrode layer may include a glass component included in the Cu paste. Accordingly, the plating solution may easily penetrate into the electrode layer, which may cause deterioration of the characteristics of the multilayer electronic component.

On the other hand, according to an example embodiment of the present disclosure, since the electrode layers 131 and 141 include Cu and a Cu-containing oxide, the penetration of the plating solution into the electrode layers 131 and 141 or an interior of the body 110 may be effectively suppressed. That is, sealing properties of the multilayer electronic component 100 may be improved.

On the other hand, since the side portions of the electrode layers 131 and 141 are regions adjacent to the cover portions C1 and C2 or the corner of the body 110 as compared to the center portion, there is a high possibility that defects may exist in a microstructure due to sintering contraction. That is, the side portions of the electrode layers 131 and 141 may be more vulnerable to the penetration of the external plating solution than the center portion. Accordingly, in an example embodiment of the present disclosure, since a content of the Cu-containing oxide in the side portions is adjusted to be greater than a content of the Cu-containing oxide in the center portion, it may be possible to improve the sealing properties of the side portions of the electrode layers 131 and 141, which is relatively more vulnerable to the plating solution, and to suppress the excessive formation of the Cu-containing oxide inside the electrode layers 131 and 141.

That is, in the multilayer electronic component 100 according to an example embodiment of the present disclosure, when the region disposed on the center of the body 110 in the first direction, in the electrode layers 131 and 141, is defined as the center portion, and the regions disposed on both sides of the center portion in the first direction and having a convex shape in the second direction are defined as the side portions, a content of the Cu-containing oxide in the side portion may be adjusted to be greater than a content of the Cu-containing oxide in the center portion, thereby improving the capacitance per unit volume and sealing properties of the multilayer electronic component 100 as well as suppressing the deterioration of the electrical connectivity of the external electrodes 130 and 140.

Meanwhile, a method of forming the center portion of the electrode layers 131 and 141, and side portions, regions disposed on both sides of the center portion in the first direction and having a convex shape in the second direction, is not particularly limited. For example, the side portions and the center portion of the electrode layers 131 and 141 according to an example embodiment may be formed using a conductive paste obtained by mixing copper powder particles of 500 nm or less, glass powder particles, and other organic materials including a dispersant. When using fine copper powder particles of 500 nm or less, the side portions of the electrode layer, which is vulnerable to plating solution penetration due to low surface tension of the fine copper powder particles, may be formed to be thick, and the center portion may be formed to be relatively thinner than the side portions. Accordingly, the sealing properties and the capacitance per unit volume of the multilayer electronic component 100 may be improved at the same time.

A method of measuring the content of the Cu-containing oxide in the center portion and the content of the Cu-containing oxide in the side portions is not particularly limited.

First, the content of the Cu-containing oxide in the side portions may be measured by calculating a ratio of at % of O to at % of Cu through a Scanning Electron Microscope-Energy Dispersive X-Ray Spectroscopy (SEM-EDS) analysis on a width×length=15 μm×15 μm region of a central portion of a region in which a maximum thickness of the electrode layers 131 and 141 is formed, in a first and second directional cross-section polished to a third directional center of the multilayer electronic component 100.

Additionally, the content of the Cu-containing oxide in the center portion may be measured by calculating a ratio of at % of O to at % of Cu through the Scanning Electron Microscope-Energy Dispersive X-Ray Spectroscopy (SEM-EDS) analysis on a width×length=15 μm×15 μm region of a central portion of a region in which a minimum thickness of the electrode layers 131 and 141 is formed, in the first and second directional cross-section polished to the third directional center of the multilayer electronic component 100. Other methods and/or tools appreciated by one of ordinary skill in the art, even if not described in the present disclosure, may also be used.

In the electrode layers 131 and 141, in the first and second directional cross-section polished to the third directional center of the multilayer electronic component 100, when the electrode layers 131 and 141 disposed on the third surface 3 or the fourth surface 4 are divided into 16 equal points in the first direction, a region from the approximately the 6/16 point to the 10/16 point may be defined as the center portion, and a region excluding the center portion may be defined as the side portion, but the present disclosure is not limited thereto, and the formation regions of the center portion and the side portion may vary depending on positions having the convex shape of the electrode layers 131 and 141.

In an example embodiment, the electrode layers 131 and 141 may include glass including one or more of B, Ba, and Si. The glass may be included in the electrode layers 131 and 141 and may serve to improve sintering characteristics. When the electrode layers 131 and 141 are sintered electrodes including glass, the glass may be eroded due to a plating layer formed on the electrode layers 131 and 141, which may damage the electrode layers 131 and 141 and may cause the deterioration of the characteristics of the multilayer electronic component 100. However, according to an example embodiment of the present disclosure, since the electrode layers 131 and 141 include Cu and a Cu-containing oxide having acid resistance, the multilayer electronic component 100 may have the sealing properties.

In an example embodiment, the electrode layers 131 and 141 may include Cu as a main component and may include an Cu-containing oxide. Specifically, the total at % of Cu and O included in the electrode layers 131 and 141 may exceed 80 at % of entire components. In this case, the entire components included in the electrode layers 131 and 141 may refer to Cu and O, and all of the other components excluding Cu and O.

In an example embodiment, the electrode layers 131 and 141 may include a region in which a ratio of at % of Cu to at % of O is 1.9 or more. When the electrode layers 131 and 141 include the Cu-containing oxide, the ratio of at % of Cu to at % of O in the electrode layers 131 and 141 may have a value equal to or greater than a specific ratio. For example, when the electrode layers 131 and 141 include $Cu_2O$ as the Cu-containing oxide, the electrode layers 131 and 141 may include a region in which the ratio of at % of Cu to at % of O is 1.9 or more.

Meanwhile, in the electrode layers 131 and 141, an area of the region in which the ratio of at % of Cu to at % of O is 1.9 or more may be ½ or more of a total area of the electrode layer. Accordingly, the proportion of the Cu-containing oxide in all the electrode layers 131 and 141 can be improved, and the sealing properties of the multilayer electronic component 100 may be further improved. The area of the region in which the ratio of at % of Cu to at % of O is 1.9 or more may be measured using SEM-EDS and an image analysis software, and the total area of the electrode layer may be measured using SEM and an image analysis software. Other methods and/or tools appreciated by one of ordinary skill in the art, even if not described in the present disclosure, may also be used.

Referring to FIGS. 2 and 3, the electrode layers 131 and 141 may include first electrode layers 131*a* and 141*a* and second electrode layers 131*b* and 141*b*. Specifically, in an example embodiment, the electrode layers 131 and 141 may include first electrode layers 131*a* and 141*a* in contact with the internal electrode 121 and 122, and second electrode layers 131*b* and 141*b* disposed on the first electrode layers 131*a* and 141*a*, and the first electrode layers 131*a* and 141*a* may include Cu, and the second electrode layers 131*b* and 141*b* may include a Cu-containing oxide. In this case, since the first electrode layers 131*a* and 141*a* in direct contact with the internal electrode 121 and 122 includes Cu, the electrical connectivity between the internal electrode 121 and 122 and the external electrodes 130 and 140 may be improved, and since the second electrode layers 131*b* and 141*b* in direct contact with plating layers 132 and 142 described below includes a Cu-containing oxide, the sealing properties of the multilayer electronic component 100 may be improved.

In an example embodiment, the first electrode layers 131*a* and 141*a* may be disposed to extend from the surfaces 3 and 4 of the body 110 opposing each other in the second direction to the surfaces 1 and 2 of the body 110 opposing each other in the first direction. However, the present disclosure is not limited to the first electrode layers 131*a* and 141*a* extending only onto the surfaces 1 and 2 of the body 110 opposing each other in the first direction, and the first electrode layers 131*a* and 141*a* may also be disposed to extend onto the surfaces 5 and 6 of the body 110 opposing in the third direction. As the first electrode layers 131*a* and 141*a* are disposed to extend onto the surfaces 1 and 2 of the body 110 opposing each other in the first direction or extend onto the surfaces 5 and 6 of the body 110 opposing each other in the third direction, the mechanical strength of the multilayer electronic component 100 may be improved.

In an example embodiment, an average thickness of the first electrode layers 131*a* and 141*a* may be 4 μm or more and 6 μm or less. As described above, since the first electrode layers 131*a* and 141*a* are in direct contact with the internal electrode 121 and 122 and serve to improve the electrical connectivity between the internal electrode 121 and 122 and the external electrodes 130 and 140, the first electrode layers 131*a* and 141*a* may be preferably formed to have a sufficient thickness. However, when the first electrode layers 131*a* and 141*a* are formed to have an excessive thickness, as the thickness of the entire electrode layers 131 and 141 excessively increases, it may be difficult to improve the capacitance per unit volume of the multilayer electronic component 100. Accordingly, the average thickness of the first electrode layers 131*a* and 141*a* may be adjusted to 4 μm or more and 6 μm or less, and accordingly, the capacitance per unit volume of the multilayer electronic component 100 may be secured, and the electrical connectivity between the internal electrode 121 and 122 and the external electrodes 130 and 140 may be secured.

As described above, since the first electrode layers 131*a* and 141*a* are in direct contact with the internal electrode 121 and 122 and serve to improve the electrical connectivity between the internal electrode 121 and 122 and the external electrodes 130 and 140, it may be preferable that the copper included in the first electrode layers 131*a* and 141*a* is substantially not oxidized. That is, in an example embodiment, the content of O in the first electrode layers 131*a* and 141*a* may be 10 at % or less as compared to the total content of elements included in the first electrode layers 131*a* and 141*a*. The content of O may be measured using SEM-EDS. Other methods and/or tools appreciated by one of ordinary skill in the art, even if not described in the present disclosure, may also be used.

As described above, since the first electrode layers 131*a* and 141*a* are in direct contact with the internal electrode 121 and 122 and serve to improve the electrical connectivity between the internal electrode 121 and 122 and the external electrodes 130 and 140, Cu included in the first electrode layers 131*a* and 141*a* may be, preferably, formed densely. That is, in an example embodiment, an area of Cu per unit area of the first electrode layers 131*a* and 141*a* may be larger than an area of Cu per unit area of the second electrode layers 131*b* and 141*b*. Accordingly, the density of Cu included in the first electrode layers 131*a* and 141*a* may be improved to improve the electrical connectivity between the internal electrode 121 and 122 and the external electrodes 130 and 140. The area of Cu per unit area in the first electrode layers 131*a* and 141*a* and the second electrode layers 131*b* and 141*b* may be measured using SEM-EDS and an image analysis software. Other methods and/or tools appreciated by one of ordinary skill in the art, even if not described in the present disclosure, may also be used.

In an example embodiment, a ratio of a maximum thickness of the electrode layers 131 and 141 to a maximum thickness of the second electrode layers 131*b* and 141*b* may be ½ or more. That is, the second electrode layers 131*b* and 141*b* may be formed to have a thickness of ½ or more as compared to a maximum thickness of the electrode layers 131 and 141 in a region in which the maximum thickness of the electrode layers 131 and 141 is formed.

Meanwhile, the electrode layers 131 and 141 may have the maximum thickness in the side portion of the electrode layers 131 and 141 described above. That is, the side portion having a convex shape in the second direction of the electrode layers 131 and 141 may be formed by the second electrode layers 131*b* and 141*b*.

Referring to FIG. 2, the maximum thickness of the second electrode layers 131*b* and 141*b* is indicated as T2max, and the minimum thickness of the second electrode layers 131*b* and 141*b* is indicated as T2min.

In this case, when T2max/T2min is less than 1.1, the side portion may be formed sufficient thickly, or the center portion may not be formed sufficient thinly, resulting in a lack of an effect in improving the capacitance per unit volume.

Additionally, when T2max/T2min is more than 2.0, the curvature of the second electrode layers 131*b* and 141*b* may be excessive, which may deteriorate plating properties.

In this example embodiment, as T2max/T2min is adjusted to satisfy 1.0 or more and 2.0 or less, an effect of increasing the capacitance per unit volume of the multilayer electronic component 100 may be secured and the problem of reduction of plating properties may be reduced.

A method of measuring a maximum thickness of the electrode layers 131 and 141, an average thickness of the first electrode layers 131*a* and 141*a*, and a minimum thickness T2min and a maximum thickness T2max of the second electrode layers 131*a* and 131*b* is not particularly limited. For example, in the first and second directional cross-section polished to the third directional center of the multilayer electronic component 100, the region in which the electrode layers 131 and 141 are formed may be measured from an image observed through an optical microscope (OM), a scanning electron microscope (SEM), a transmission electron microscope (TEM), or the like. Other methods and/or tools appreciated by one of ordinary skill in the art, even if not described in the present disclosure, may also be used Specifically, the maximum thickness of the electrode layers 131 and 141, and the maximum thickness T2max and the minimum thickness T2min of the second electrode layers 131*a* and 131*b* may refer to a second directional size of a region in which a maximum or minimum thickness is formed in the electrode layers 131 and 141 and the second electrode layers 131*a* and 131*b*.

On the other hand, the average thickness of the first electrode layers 131*a* and 141*a* may be a value obtained by dividing a region of the first electrode layers 131*a* and 141*a* disposed on the capacitance formation portion Ac into five equal points in the first direction, measuring second directional sizes in each region, and then measuring an average thereof.

In an example embodiment, the external electrodes 130 and 140 may further include plating layers 132 and 142 disposed on the electrode layers 131 and 141.

The plating layers 132 and 142 serve to improve the mounting characteristics. The type of plating layers 132 and 142 is not particularly limited, and may be plating layers 132 and 142 including one or more of Ni, Sn, Pd, and alloys thereof, and the plating layers 132 and 142 may be formed of a plurality of layers.

For a more specific example of the plating layers 132 and 142, the plating layers 132 and 142 may be a Ni plating layer or a Sn plating layer, and may be in a form in which the Ni plating layer and the Sn plating layer are sequentially formed on the electrode layers 131 and 141, and may be in a form in which the Sn plating layer, the Ni plating layer, and the Sn plating layer are sequentially formed. Additionally, the plating layers 132 and 142 may include a plurality of Ni plating layers and/or a plurality of Sn plating layers. Additionally, the plating layer may be in a form in which the Ni plating layer and the Pd plating layer are sequentially formed on the electrode layer.

In an example embodiment, the second electrode layers 131*b* and 141*b* may not be disposed on the surfaces 1 and 2 of the body 110 opposing each other in the first direction. Additionally, the second electrode layers 131*b* and 141*b* may not be disposed on the surfaces 5 and 6 of the body 110 opposing each other in the third direction. Accordingly, the capacitance per unit volume of the multilayer electronic component 100 may be further improved.

Meanwhile, referring to FIG. 8, it may be confirmed that the first electrode layer 131*a* has substantially no region in which a Cu-containing oxide (gray, dark portion) is formed, as compared to the second electrode layer 131*b*, and it may be confirmed that a large number of Cu-containing oxides are formed in the second electrode layer 131*b*. That is, it may be confirmed that the first electrode layer 131*a* is a thin layer having high density of Cu, the second electrode layer 131*b* includes the Cu-containing oxide, and a convex-shaped side portion of the electrode layer is formed. However, the description of FIG. 8 is only an example to help understand the present disclosure, and it should be noted that the present disclosure is not limited to the first electrode layer 131*a* and the second electrode layer 131*b* illustrated in FIG. 8.

Figure 6:
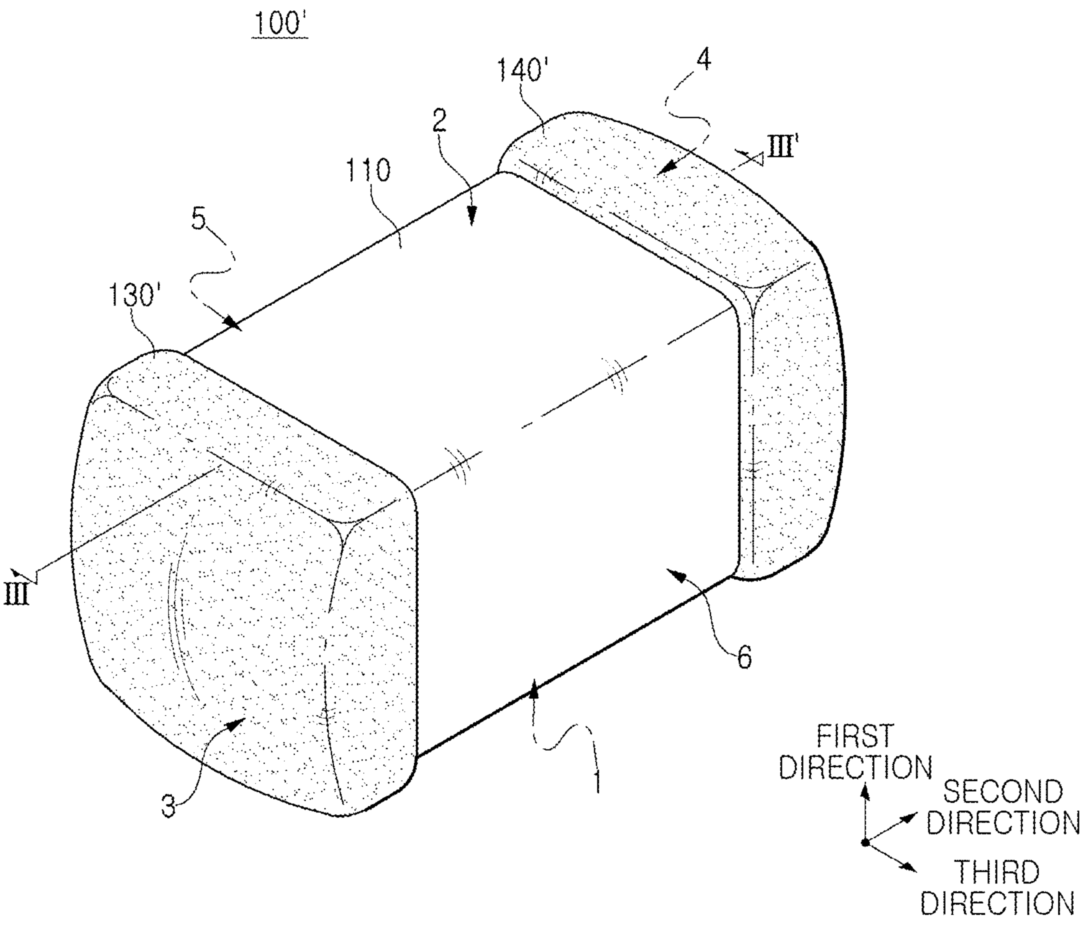
FIG. 6 schematically illustrates a perspective view of a multilayer electronic component according to an example embodiment.

FIG. 6 schematically illustrates a perspective view of a multilayer electronic component according to an example embodiment.

Figure 7:
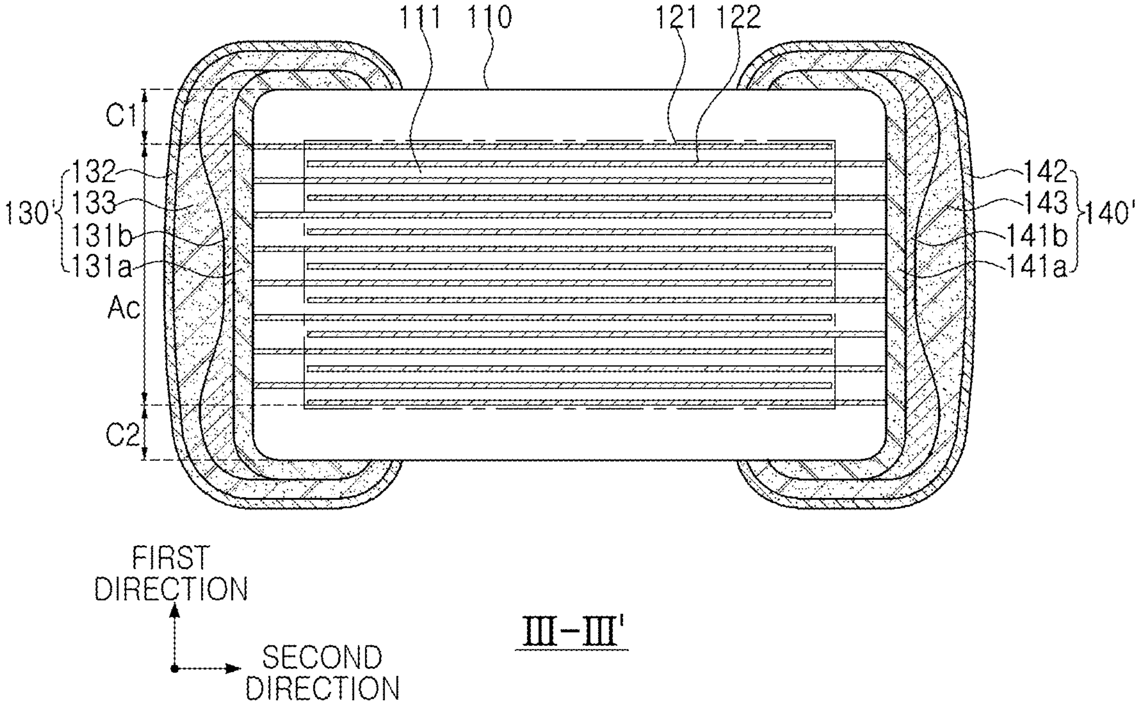
FIG. 7 is a cross-sectional view taken along line III-III' in FIG. 6.

FIG. 7 is a cross-sectional view taken along line III-III' in FIG. 6.

Referring to FIGS. 6 and 7, external electrode 130' and 140' of a multilayer electronic component 100' according to an example embodiment include electrode layers 131 and 141 connected to internal electrodes 121 and 122 and including Cu and an Cu-containing oxide.

The external electrodes 130' and 140' of the multilayer electronic component 100' according to an example embodiment may further include conductive resin layers 133 and 143 disposed on the electrode layers 131 and 141, and plating layers 132 and 142 disposed on the conductive resin layers 133 and 143. Accordingly, even when the conductive resin layers 133 and 143 are formed on the external electrodes 130' and 140', the proportion of the external electrodes 130' and 140' in the multilayer electronic component 100' may be reduced, thereby improving the capacitance per unit volume of the multilayer electronic component 100'.

Although the example embodiment of the present disclosure has been described in detail above, the present disclosure is not limited to the above-described embodiments and the accompanying drawings but is defined by the appended claims. Therefore, those of ordinary skill in the art may make various replacements, modifications, or changes without departing from the scope of the present disclosure defined by the appended claims, and these replacements, modifications, or changes should be construed as being included in the scope of the present disclosure.

In addition, the expression 'an example embodiment' used in the present disclosure does not mean the same embodiment, and is provided to emphasize and explain different unique characteristics. However, the embodiments presented above do not preclude being implemented in combination with the features of another embodiment. For example, although items described in a specific embodiment are not described in another embodiment, the items may be understood as a description related to another embodiment unless a description opposite or contradictory to the items is in another embodiment.

In the present disclosure, the terms are merely used to describe a specific embodiment, and are not intended to limit the present disclosure. Singular forms may include plural forms as well unless the context clearly indicates otherwise.

What is claimed is:

1. A multilayer electronic component, comprising:

a body including a dielectric layer and internal electrodes alternately arranged in a first direction with the dielectric layer interposed therebetween; and an external electrode disposed on surfaces of the body opposing each other in a second direction that is perpendicular to the first direction, wherein the external electrode includes an electrode layer connected to the internal electrodes and including Cu and a Cu-containing oxide, in the electrode layer, when a region disposed on a center of the body in the first direction is defined as a center portion, and a region disposed on a side of the center portion in the first direction and having a convex shape in the second direction are defined as a side portion, a content of the Cu-containing oxide in the side portion is greater than the content of the Cu-containing oxide in the center portion.

2. The multilayer electronic component according to claim 1, wherein the electrode layer includes a region in which a ratio of at % of Cu to at % of O is 1.9 or more.

3. The multilayer electronic component according to claim 2, wherein in the electrode layer, an area of the region in which the ratio of at % of Cu to at % of O is 1.9 or more is ½ or more of a total area of the electrode layer.

4. The multilayer electronic component according to claim 1, wherein the electrode layer includes a first electrode layer in contact with the internal electrodes and a second electrode layer disposed on the first electrode layer, wherein the first electrode layer includes Cu, and the second electrode layer includes the Cu-containing oxide.

5. The multilayer electronic component according to claim 4, wherein the first electrode layer is disposed to extend from the surfaces of the body opposing each other in the second direction to surfaces of the body opposing each other in the first direction.

6. The multilayer electronic component according to claim 4, wherein the second electrode layer is not disposed on surfaces of the body opposing each other in the first direction.

7. The multilayer electronic component according to claim 4, wherein an average thickness of the first electrode layer is 4 μm 6 μm.

8. The multilayer electronic component according to claim 4, wherein when a maximum thickness of the second electrode layer is defined as T2max and a minimum thickness of the second electrode layer is defined as T2min, T2max/T2min satisfies 1.0 to 2.0.

9. The multilayer electronic component according to claim 4, wherein a ratio of a maximum thickness of the second electrode layer to a maximum thickness of the electrode layer is ½ or more.

10. The multilayer electronic component according to claim 4, wherein a content of O in the first electrode layer is 10 at % or less as compared to a total content of elements included in the first electrode layer.

11. The multilayer electronic component according to claim 4, wherein an area of Cu per unit area of the first electrode layer is larger than an area of Cu per unit area of the second electrode layer.

12. The multilayer electronic component according to claim 4, wherein the second electrode layer is continuous from a first corner of the body to a second corner of the body, and the second corner opposes the first corner along the first direction.

13. The multilayer electronic component according to claim 12, wherein the second electrode layer in the side portion has the maximum thickness, and the second electrode layer in the center portion has the minimum thickness.

14. The multilayer electronic component according to claim 12, wherein the external electrode further includes a plating layer that directly contacts the first electrode layer.

15. The multilayer electronic component according to claim 12, wherein the external electrode further includes a conductive resin layer that directly contacts the first electrode layer.

16. The multilayer electronic component according to claim 1, wherein the external electrode further includes a plating layer disposed on the electrode layer.

17. The multilayer electronic component according to claim 1, wherein the external electrode further includes a conductive resin layer disposed on the electrode layer, and a plating layer disposed on the conductive resin layer.

18. The multilayer electronic component according to claim 1, wherein the electrode layer includes glass including at least one selected from the group consisting of B, Ba, and Si.

* * * * *